United States Patent
Hou et al.

(10) Patent No.: US 12,304,877 B1
(45) Date of Patent: May 20, 2025

(54) PREPARATION METHOD OF COMPOSITE SLOW-RELEASE NANO-NITROGEN FERTILIZER

(71) Applicant: Shanxi Agricultural University, Taiyuan (CN)

(72) Inventors: Xiangyang Hou, Taiyuan (CN); Guohua Ren, Taiyuan (CN); Lixia Du, Taiyuan (CN); Caixia Wang, Taiyuan (CN); Liyuan Cui, Taiyuan (CN)

(73) Assignee: Shanxi Agricultural University, Taiyuan (CN)

( * ) Notice: Subject to any disclaimer, the term of this patent is extended or adjusted under 35 U.S.C. 154(b) by 0 days.

(21) Appl. No.: 18/966,734

(22) Filed: Dec. 3, 2024

(30) Foreign Application Priority Data

Jun. 4, 2024  (CN) .......................... 202410716870.2

(51) Int. Cl.
| | | |
|---|---|---|
| *C05G 5/40* | (2020.01) | |
| *C05C 9/00* | (2006.01) | |
| *C05F 11/02* | (2006.01) | |
| *C05G 3/40* | (2020.01) | |

(52) U.S. Cl.
CPC ................ *C05G 3/40* (2020.02); *C05C 9/005* (2013.01); *C05F 11/02* (2013.01); *C05G 5/40* (2020.02)

(58) Field of Classification Search
CPC .. C05G 3/40; C05G 5/40; C05C 9/005; C05F 11/02
See application file for complete search history.

(56) References Cited

FOREIGN PATENT DOCUMENTS

CN         108017472 A   *   5/2018

* cited by examiner

*Primary Examiner* — Jennifer A Smith
(74) *Attorney, Agent, or Firm* — Thomas | Horstemeyer, LLP

(57) ABSTRACT

A preparation method of a composite slow-release nano-nitrogen fertilizer: stirring cellulose, nanoclay, and water to allow a reaction to obtain a mixture, subjecting the mixture to solid-liquid separation, and then subjecting an obtained solid to drying, crushing, and sieving in sequence to obtain a solid sample $a_1$; subjecting the solid sample $a_1$ to pyrolysis, and then cooling an obtained product to a room temperature to obtain a solid sample $a_2$; sieving humic acid and the nanoclay and adding into water and stirring to allow a reaction to obtain a mixture, subjecting the mixture to solid-liquid separation, and then subjecting an obtained solid to drying, crushing, and sieving in sequence to obtain a solid sample $b_2$; subjecting the solid sample $a_2$, the solid sample $b_2$, and urea to melt-blending, and then subjecting an obtained mixture to washing, drying, and crushing in sequence to obtain the composite slow-release nano-nitrogen fertilizer.

7 Claims, No Drawings

PREPARATION METHOD OF COMPOSITE SLOW-RELEASE NANO-NITROGEN FERTILIZER

CROSS REFERENCE TO RELATED APPLICATION

This patent application claims the benefit and priority of Chinese Patent Application No. 202410716870.2, filed with the China National Intellectual Property Administration on Jun. 4, 2024, the disclosure of which is incorporated by reference herein in its entirety as part of the present application.

TECHNICAL FIELD

A preparation method of a composite slow-release nano-nitrogen fertilizer is provided, belonging to the technical field of nano-fertilizers.

BACKGROUND

Grasslands in northern China, especially grassland ecosystems in semi-arid areas, play a vital role in maintaining regional ecological balance and ensuring the sustainable development of animal husbandry. However, the soil in northern China is generally deficient in phosphorus and nitrogen, and the nitrogen as one of the essential elements for plant growth is crucial for the growth and development of grass. Nitrogen is a component of important substances such as proteins, nucleic acids, enzymes, and chlorophyll in plants. Nitrogen availability directly affects photosynthesis efficiency, leaf growth, greenness, and yield of the grass. Specifically, nitrogen can promote the growth of grass roots, increase the absorption area, improve the efficiency of photosynthesis, and promote the health, thickness, and bright color of leaves, thereby promoting growth and development and increasing yield for the grass. In addition, nitrogen improves disease resistance, enhances the development of immune system, and improves stress resistance for the grass, making the grass more adaptable to environmental changes. Phosphorus also plays an important role in grass growth. Phosphorus serves as a component of the protoplasm in plants that is important in cell growth and proliferation. Phosphorus is involved in photosynthesis, utilization of saccharides and starch, and energy transfer in plant life processes. Phosphorus can promote the growth of grass roots in the seedling stage to make the grass mature earlier. Phosphorus is also an important component of compounds such as nucleic acids, phosphates, phospholipids, and nucleoproteins, which are of great significance for maintaining the normal physiological functions of grass. Inadequate phosphorus supply can result in slow grass growth, poor root development, reduced branching, and short plants.

Therefore, fertilization is one of the effective means of grassland restoration. However, it is an indisputable fact that traditional chemical fertilizers are easily lost, resulting in low nutrient utilization and pollution of soil and water. On one hand, chemical fertilizers can cause serious soil pollution. The chemical fertilizers used in traditional fertilization, such as nitrogen fertilizers and phosphate fertilizers, contain some toxic substances such as arsenic, cadmium, chromium, fluorine, and palladium, which may cause soil pollution. These pollutants may not only directly affect soil quality, but may also affect human health through the food chain. For example, cadmium pollution has been shown to lead to increased cancer incidence. On the other hand, chemical fertilizers can cause damage to soil structure and fertility: after long-term and large-scale use of the chemical fertilizers, a soil aggregate structure may be destroyed due to the lack of organic matter and humus, causing soil hardening. The soil hardening not only affects soil aeration and water permeability, but may also affect the root development and yield of crops. At the same time, the nutrients in chemical fertilizers are generally only targeted at a certain crop or a certain stage of crop growth. Long-term single use of the chemical fertilizers may lead to excessive accumulation of certain elements in the soil and changes in the physical and chemical properties of the soil, thus affecting overall fertility of the soil.

In recent years, with the continuous innovation and rapid development of nanotechnology, the continuous breakthroughs in nano-preparation technology have led to the emergence of novel nanomaterials. Nanomaterials have shown a great application potential in many fields due to their unique physical, chemical, and mechanical properties, and their application in the agricultural field has also received increasing attention. In this context, many scholars have begun to explore the combination of nanomaterials with fertilizers to develop nano-fertilizers with a slow-release function.

Chinese patent CN114853540A has disclosed a water-retaining slow-release fertilizer, including the following components in parts by weight: 30 parts to 80 parts of a urea-formaldehyde compound fertilizer, 14 parts to 22 parts of humic acid, 5 parts to 12 parts of a granular phosphate bacterial fertilizer, 30 parts to 35 parts of nonionic polyacrylamide, and 15 parts to 21 parts of modified attapulgite. This Chinese patent solves the problem of reduced water absorption and retention capacity of a water-retaining agent when the water-retaining agent is mixed with a slow-release fertilizer by adopting technical solutions. This technology simply uses a kind of attapulgite nanomaterial as an auxiliary material for slow release of the water-retaining slow-release fertilizer, and its effect needs further investigation. Meanwhile, the bacterial fertilizer used in this technology is organic phosphorus bacteria or inorganic phosphorus bacteria, which may be affected by the environment to cause the bacteria to be inactivated.

Chinese patent CN116730771B has disclosed a slow-release nitrogen fertilizer and a preparation method thereof. The slow-release nitrogen fertilizer includes a metal organic framework-covalent organic framework (MOF-COF) composite, sodium carboxymethyl cellulose, sodium alginate, ammonium chloride, and water. The slow-release nitrogen fertilizer has a desirable slow-release effect, can absorb heavy metal ions in the soil and provide nutrients, and shows excellent water and fertilizer retention performances. However, the MOF-COF composite in this technology requires complex reaction conditions during the preparation, and it is difficult to ensure a stability of the product. Moreover, other substances may be introduced during the preparation, causing environmental pollution.

Chinese patent CN111533613B has disclosed a nanocellulose gel-based water-retaining slow-release fertilizer and a preparation method thereof. However, the preparation method has a complex process with high requirements on production equipment, and is difficult to achieve mass production.

In summary, developing a nanoscale slow-release fertilizer with desirable slow-release performance, soil-friendliness, simple production process, and low cost is crucial for the maintenance of grassland ecosystems in semi-arid areas of China. As a result, it is urgent to propose a composite slow-release nano-nitrogen fertilizer to solve the current problems of grassland fertilizer used in semi-arid areas of China.

SUMMARY

In view of the problems existing in the prior art such as poor slow-release performance of slow-release nano-fertilizers, impact on the soil environment, complex production process, and high production cost, the present disclosure discloses a preparation method of a composite slow-release nano-nitrogen fertilizer.

The present disclosure adopts the following technical solutions:

the preparation method includes the following steps:

step S1, sieving cellulose and nanoclay and adding into water and stirring to allow a reaction to obtain a mixture, subjecting the mixture to solid-liquid separation, and then subjecting an obtained solid to drying, crushing, and sieving in sequence to obtain a solid sample $a_1$;

step S2, subjecting the solid sample $a_1$ to pyrolysis at a pyrolysis temperature of 500° C. to 800° C. for 2 h to 3 h under a nitrogen atmosphere, and then cooling an obtained product to a room temperature to obtain a solid sample $a_2$;

step S3, sieving humic acid and the nanoclay and adding into water and stirring to allow a reaction to obtain a mixture, subjecting the mixture to solid-liquid separation, and then subjecting an obtained solid to drying, crushing, and sieving in sequence to obtain a solid sample $b_2$; and step S4, subjecting the solid sample $a_2$, the solid sample $b_2$, and urea to melt-blending, and then subjecting an obtained mixture to washing with anhydrous ethanol, drying, and crushing in sequence to obtain the composite slow-release nano-nitrogen fertilizer.

By adopting the above technical solutions, material screening ensures the uniformity of raw materials and the suitability of particle size, which are beneficial to the subsequent reaction and the uniformity of products. The nanoclay and cellulose are mixed in advance such that the nanoclay and cellulose are fully mixed. Since there are a large number of metal cations such as $Na^+$, $K^+$, $Mg^{2+}$, $Ca^{2+}$, and $Al^{3+}$ in the nanoclay, which adsorb with the anions in the cellulose, the nanoclay can play a filling role in the cellulose, making the cellulose pyrolysis more complete. The nanoclay, as a nanomaterial, has a large specific surface area and adsorption capacity and can adsorb a large amount of humic acid. In the composite slow-release nano-nitrogen fertilizer obtained by melt-blending, urea infiltrates into a solid sample $a_1$ and a solid sample $b_2$ in a molten state, and humic acid and urea are mixed in a solid phase. Humic acid is an organic substance that can increase the organic content of fertilizers, improve the soil environment, and promote the activity of soil microorganisms, and is also beneficial to the growth and development of plants; and active functional groups in the humic acid can react chemically with urea at a certain temperature. This process improves the stability of an internal valence bonds of urea-humic acid, providing conditions for improving urea fertilizer efficiency and N utilization. At the same time, the reaction results can lead to an increase in pH value, a decrease in exchange capacity, a decrease in carboxyl content, and an increase in water-soluble humic acid, thereby increasing solubility in the soil. The cellulose after pyrolysis becomes a desirable carbon-based adsorption material, which can interact with the nanoclay and load more urea. During use, the fertilizer can be slowly released, which not only prolongs a fertilizer effect but also saves costs. [0018] In a specific example, the nanoclay in steps S1 and S3 is one or two selected from the group consisting of montmorillonite and halloysite.

By utilizing the large specific surface area and adsorption capacity of nanoclay, nutrients can be adsorbed and stored, further enhancing the slow-release effect of fertilizers. At the same time, nanoclay can also improve soil structure and enhance soil water and fertilizer retention capacity. The nanoclay in the present disclosure is halloysite or montmorillonite, or a mixture thereof. A tubular structure of halloysite or an interlayer structure of montmorillonite can load urea, and can cooperate with other components to achieve a slow-release effect in the composite slow-release nano-nitrogen fertilizer.

In a specific example, the nanoclay in steps S1 and S3 is washed with hydrochloric acid before use; and a washing process includes: mixing the nanoclay and the hydrochloric acid with a mass fraction of 30% to 35% at a mass-to-volume ratio of 1 g:(50-100) mL, stirring an obtained mixture at a room temperature for 0.5 h to 1 h, and then conducting solid-liquid separation, drying, crushing, and sieving in sequence to obtain a pretreated nanoclay.

The nanoclay is pretreated before use to remove impurities in the halloysite tubes or between montmorillonite layers, thereby providing more space for the loading of urea.

In a specific example, the cellulose, the nanoclay, and the water are at a mass ratio of (7-8):1:(400-500), and the reaction is conducted by stirring at 75° C. to 90° C. for 2 h to 3 h in step S1. [0023] The reaction temperature of 75° C. to 90° C. is a relatively mild range, which does not cause obvious chemical changes in cellulose and nanoclay, but can ensure sufficient reaction activity to promote the interaction between cellulose and nanoclay.

In a specific example, the nitrogen atmosphere has a nitrogen flow rate of (20-40) $mL/min^{-1}$, and the pyrolysis temperature is obtained by heating at (10-15°) $C/min^{-1}$ in step S2.

In a specific example, the humic acid, the nanoclay, and the water are at a mass ratio of (10-13):1:(400-500), and the reaction is conducted by stirring at 50° C. to 60° C. for 2 h to 3 h in step S3.

In a specific example, the solid sample $a_2$, the solid sample $b_2$, and the urea are at a mass ratio of (1-3):(1-3):(5-10), the melt-blending is conducted at 140° C. to 150° C., and the washing with the anhydrous ethanol is conducted 2 to 3 times in step S4.

In the present disclosure, the mass ratio of the solid sample $a_2$, the solid sample $b_2$, and the urea is reasonably controlled to ensure that the interaction between the components during the reaction is optimal. The melt-blending is reasonably controlled at 140° C. to 150° C. to ensure that each substance can maintain a high reactivity at this temperature stage. At the same time, excessively high temperatures that cause urea decomposition or other side reactions are avoided. [0028] The present disclosure has the following beneficial effects:

(1) In the present disclosure, nanoclay is used. By utilizing the large specific surface area and adsorption capacity of nanoclay, nutrients can be adsorbed and stored, further enhancing the slow-release effect of fertilizers. Moreover, the nanoclay can also improve soil structure and enhance the soil's ability to retain water and fertilizer. The nanoclay is halloysite or montmorillonite, or a mixture thereof. Before use, the nanoclay is pretreated to remove impurities in the halloysite tubes or between the montmorillonite layers, providing more space for the loading of urea. A tubular structure of halloysite or an interlayer structure of montmorillonite can load urea, and can cooperate with other components in the composite slow-release nano-nitrogen fertilizer to achieve a slow-release effect.

(2) In the present disclosure, the nanoclay and cellulose are mixed in advance such that the nanoclay and cellulose are fully mixed. Since there are a large number of metal cations such as $Na^+$, $K^+$, $Mg^{2+}$, $Ca^{2+}$, and $Al^{3+}$ in the nanoclay, which adsorb with the anions in the cellulose, the nanoclay can play a filling role in the cellulose, making the cellulose pyrolysis more complete.

(3) The nanoclay, as a nanomaterial, has a large specific surface area and adsorption capacity and can adsorb a large amount of humic acid. In the composite slow-release nano-nitrogen fertilizer obtained by melt-blending, urea infiltrates into a solid sample $a_1$ and a solid sample $b_2$ in a molten state, and humic acid and urea are mixed in a solid phase. Humic acid is an organic substance that can increase the organic content of fertilizers, improve the soil environment, and promote the activity of soil microorganisms, and is also beneficial to the growth and development of plants; and active functional groups in the humic acid can react chemically with urea at a certain temperature. This process improves the stability of an internal valence bond of urea-humic acid, providing conditions for improving urea fertilizer efficiency and N utilization. At the same time, the reaction results can lead to an increase in pH value, a decrease in exchange capacity, a decrease in carboxyl content, and an increase in water-soluble humic acid, thereby increasing solubility in the soil. The cellulose after pyrolysis becomes a desirable carbon-based adsorption material, which can interact with the nanoclay and load more urea. During use, the fertilizer can be slowly released, which not only prolongs a fertilizer effect but also saves costs.

(4) In the present disclosure, the solid sample $a_2$ and the solid sample $b_2$ can cooperate with each other to increase the loading amount of urea, and the solid sample $a_2$ and the solid sample $b_2$ can also slowly release urea, increase fertilizer efficiency, and improve nitrogen utilization efficiency. The humic acid can also further affect a process of converting urea into ammonium nitrogen by inhibiting an activity of urease in the soil, significantly reducing the amount of ammonia volatilization in the soil and improving the utilization rate of nitrogen fertilizer by plants.

(5) In the present disclosure, the nanoclay and cellulose are mixed and pyrolyzed. Due to the presence of calcium and magnesium in the nanoclay, the negative charge of cellulose is reduced, and phosphorus in the soil can be adsorbed. At this time, the cellulose can easily form calcium- and magnesium-related precipitation with phosphorus, avoiding large amounts of phosphorus loss to reduce fertilizer efficiency and pollute the soil, and then further improving the utilization rate of phosphorus.

DETAILED DESCRIPTION OF THE EMBODIMENTS

To further describe the technical means adopted by the present disclosure to achieve the intended purpose and the effects of the technical means, the specific implementations, structures, features, and effects of the present disclosure are described in detail below with reference to the preferred examples.

Example 1

This example provided a preparation method of a composite slow-release nano-nitrogen fertilizer, including the following steps:

Step S1, halloysite and hydrochloric acid with a mass fraction of 33% were mixed at a ratio of 1 g:75 mL, magnetically stirred under room temperature for 0.8 h at 240 r/min, and suction filtration was conducted to obtain a solid, which was dried at 110° C. for 6 h, crushed and sieved through a 100-mesh sieve to obtain pretreated halloysite. The pretreated halloysite, cellulose, and water were mixed at a mass ratio of 7.5:1:450 and stirred to allow reaction for 2.5 h at 85° C. and 240 r/min, and suction filtration was conducted to obtain a solid, which was dried at 95° C. for 6 h, crushed and sieved through a 100-mesh sieve to obtain a solid sample $a_1$.

Step S2, the solid sample $a_1$ was heated to 650° C. at 12° C./min$^{-1}$ under a nitrogen atmosphere with a nitrogen flow rate of 30 mL/min$^{-1}$ to allow pyrolysis for 2.5 h, and then cooled to room temperature to obtain a solid sample $a_2$.

Step S3, humic acid and the pretreated halloysite were passed through a 100-mesh sieve, added into water and stirred at 55° C. for 2.5 h to obtain a mixture, the mixture was subjected to suction filtration, an obtained solid was dried at 80° C. for 7 h, crushed and sieved through a 100-mesh sieve to obtain a solid sample $b_2$; where the humic acid, the nanoclay, and the water were at a mass ratio of 11.5:1:450.

Step S4, the solid sample $a_2$, the solid sample $b_2$, and urea were subjected to melt-blending at 145° C., where the solid sample $a_2$, the solid sample $b_2$, and urea were at a mass ratio of 2:2:7.5; and an obtained product was washed 3 times with anhydrous ethanol, dried at 80° C., crushed and sieved through a 100-mesh sieve to obtain the composite slow-release nano-nitrogen fertilizer.

Example 2

This example provided a preparation method of a composite slow-release nano-nitrogen fertilizer, including the following steps:

Step S1, montmorillonite and hydrochloric acid with a mass fraction of 30% were mixed at a ratio of 1 g:100 mL, magnetically stirred under room temperature for 0.5 h at 240 r/min, and suction filtration was conducted to obtain a solid, which was dried at 110° C. for 6 h, crushed and sieved through a 100-mesh sieve to obtain pretreated montmorillonite. The pretreated montmorillonite, cellulose, and water were mixed at a mass ratio of 8:1:400 and stirred to allow reaction for 2 h at 90° C. and 240 r/min, and suction filtration was conducted to obtain a solid, which was dried at 95° C. for 6 h, crushed and sieved through a 100-mesh sieve to obtain a solid sample $a_1$.

Step S2, the solid sample $a_1$ was heated to 500° C. at 15° C./min$^{-1}$ under a nitrogen atmosphere with a nitrogen flow rate of 20 mL/min- to allow pyrolysis for 3 h, and then cooled to room temperature to obtain a solid sample $a_2$.

Step S3, humic acid and the pretreated montmorillonite were passed through a 100-mesh sieve, added into water and stirred at 60° C. for 2 h to obtain a mixture, the mixture was subjected to suction filtration, an obtained solid was dried at 80° C. for 7 h, crushed and sieved through a 100-mesh sieve to obtain a solid sample $b_2$; where the humic acid, the nanoclay, and the water were at a mass ratio of 13:1:400.

Step S4, the solid sample $a_2$, the solid sample $b_2$, and urea were subjected to melt-blending at 140° C., where the solid sample $a_2$, the solid sample $b_2$, and urea were at a mass ratio of 1:3:5; and an obtained product was washed 3 times with anhydrous ethanol, dried at 80° C., crushed and sieved through a 100-mesh sieve to obtain the composite slow-release nano-nitrogen fertilizer.

Example 3

This example provided a preparation method of a composite slow-release nano-nitrogen fertilizer, including the following steps:

Step S1, montmorillonite and hydrochloric acid with amass fraction of 35% were mixed at a ratio of 1 g:50 mL, magnetically stirred under room temperature for 1 h at 240 r/min, and suction filtration was conducted to obtain a solid, which was dried at 110° C. for 6 h, crushed and sieved through a 100-mesh sieve to obtain pretreated montmorillonite. The pretreated montmorillonite, cellulose, and water were mixed at a mass ratio of 8:1:500 and stirred to allow reaction for 3 h at 75° C. and 240 r/min, and suction filtration was conducted to obtain a solid, which was dried at 95° C. for 6 h, crushed and sieved through a 100-mesh sieve to obtain a solid sample $a_1$.

Step S2, the solid sample $a_1$ was heated to 800° C. at 10° C./min$^{-1}$ under a nitrogen atmosphere with a nitrogen flow rate of 40 mL/min$^{-1}$ to allow pyrolysis for 2 h, and then cooled to room temperature to obtain a solid sample $a_2$.

Step S3, humic acid and the pretreated montmorillonite were passed through a 100-mesh sieve, added into water and stirred at 50° C. for 3 h to obtain a mixture, the mixture was subjected to suction filtration, an obtained solid was dried at 80° C. for 7 h, crushed and sieved through a 100-mesh sieve to obtain a solid sample $b_2$; where the humic acid, the nanoclay, and the water were at a mass ratio of 10:1:500.

Step S4, the solid sample $a_2$, the solid sample $b_2$, and urea were subjected to melt-blending at 150° C., where the solid sample $a_2$, the solid sample $b_2$, and urea were at a mass ratio of 3:1:10; and an obtained product was washed 2 times with anhydrous ethanol, dried at 80° C., crushed and sieved through a 100-mesh sieve to obtain the composite slow-release nano-nitrogen fertilizer.

Example 4

This example provided a preparation method of a composite slow-release nano-nitrogen fertilizer, including the following steps:

Step S1, halloysite was mixed with montmorillonite at a mass ratio of 1:1 and then mechanically stirred for 10 min to obtain a mixed nanoclay, the mixed nanoclay and hydrochloric acid with a mass fraction of 34% were mixed at a ratio of 1 g:80 mL, magnetically stirred under room temperature for 0.9 h at 240 r/min, and suction filtration was conducted to obtain a solid, which was dried at 110° C. for 6 h, crushed and sieved through a 100-mesh sieve to obtain pretreated mixed nanoclay. The pretreated mixed nanoclay, cellulose, and water were mixed at a mass ratio of 7:1:490 and stirred to allow reaction for 2.7 h at 85° C. and 240 r/min, and suction filtration was conducted to obtain a solid, which was dried at 95° C. for 6 h, crushed and sieved through a 100-mesh sieve to obtain a solid sample at.

Step S2, the solid sample $a_1$ was heated to 600° C. at 12° C./min$^{-1}$ under a nitrogen atmosphere with a nitrogen flow rate of 35 mL/min$^t$ to allow pyrolysis for 2 h to 3 h, and then cooled to room temperature to obtain a solid sample $a_2$.

Step S3, humic acid and the pretreated mixed nanoclay were passed through a 100-mesh sieve, added into water and stirred at 56° C. for 2.5 h to obtain a mixture, the mixture was subjected to suction filtration, an obtained solid was dried at 80° C. for 7 h, crushed and sieved through a 100-mesh sieve to obtain a solid sample $b_2$; where the humic acid, the nanoclay, and the water were at a mass ratio of 12:1:460.

Step S4, the solid sample $a_2$, the solid sample $b_2$, and urea were subjected to melt-blending at 145° C. where the solid sample $a_2$, the solid sample $b_2$, and urea were at a mass ratio of 2:3:7; and an obtained product was washed 3 times with anhydrous ethanol, dried at 80° C., crushed and sieved through a 100-mesh sieve to obtain the composite slow-release nano-nitrogen fertilizer.

Comparative Example 1

This comparative example differed from Example 1 mainly in that the halloysite used in this comparative example was not pretreated with hydrochloric acid.

Comparative Example 2

This comparative example differed from Example 1 mainly in that there was no pyrolysis in step S2 in this comparative example.

Comparative Example 3

This comparative example differed from Example 1 mainly in that the composite slow-release nano-nitrogen fertilizer in this comparative example did not include the solid sample $a_2$.

Comparative Example 4

This comparative example differed from Example 1 mainly in that the composite slow-release nano-nitrogen fertilizer in this comparative example did not include the solid sample $b_2$.

Performance Test

With reference to the evaluation criteria of the European Committee for Standardization for slow-release fertilizers, the nutrient release of fertilizers was detected at 25° C. within 24 h, 4 d, 28 d, 60 d, and 120 d, and N element release rate (%) of the examples and comparative examples was calculated. The results were shown in the following table.

TABLE 1

| Sample | 24 h | 4 d | 28 d | 60 d | 120 d |
|---|---|---|---|---|---|
| Example 1 | 3.42 | 4.50 | 19.25 | 26.56 | 50.39 |
| Example 2 | 5.86 | 6.93 | 23.19 | 29.15 | 54.79 |
| Example 3 | 5.02 | 6.14 | 22.87 | 30.98 | 55.03 |
| Example 4 | 4.94 | 5.86 | 20.48 | 29.18 | 52.94 |
| Comparative Example 1 | 10.26 | 13.01 | 55.91 | 65.39 | 80.16 |
| Comparative Example 2 | 12.84 | 15.95 | 58.63 | 69.83 | 85.49 |
| Comparative Example 3 | 14.77 | 18.59 | 59.94 | 68.96 | 85.06 |
| Comparative Example 4 | 14.73 | 19.14 | 63.75 | 73.24 | 89.86 |

As could be seen from the above table, the data of composite slow-release nano-nitrogen fertilizer prepared in the present disclosure were compared with those of comparative examples 1 to 4. The results showed that the composite slow-release nano-nitrogen fertilizer could slowly reduce the release period of nitrogen. The release rate of nitrogen was 50.39% at day 120, while the release rate of nitrogen in comparative example 4 was 89.86% at day 120. Comparative Examples 2 and 3 also released a lot of nitrogen at day 120, which might be due to the fact that Comparative Example 2 did not undergo pyrolysis, which was similar to that of no solid sample $a_2$ in Example 3. Since the fiber without pyrolysis could not achieve the carbonization effect, could not form a carbon-based porous adsorption material, and therefore could not achieve the slow-release effect. The poor effect of Comparative Example 1 might be due to the fact that the halloysite had not been treated with acid, and the impurities contained in its tubular structure had not been washed out, which could not provide more space for urea to enter the tube, resulting in a significant reduction in the loading amount of urea. In the present disclosure, the nanoclay was pretreated to remove impurities in the halloysite tubes or between the montmorillonite layers, providing more space for the loading of urea. A tubular structure of halloysite or an interlayer structure of montmorillonite could load urea, and could cooperate with other components in the composite slow-release nano-nitrogen fertilizer to achieve a slow-release effect. In addition, the solid sample $a_2$ and the solid sample $b_2$ could cooperate with each other to increase the loading amount of urea, and could also slowly release urea, increase fertilizer efficiency, and improve nitrogen utilization efficiency.

The above examples are only preferred examples of the present disclosure, and are not intended to limit the present disclosure in any form. Although the present disclosure is disclosed through the above preferred examples, these preferred examples are not intended to limit the present disclosure. Any person skilled in the art may make some changes or modifications to the above technical contents without departing from the scope of the technical solution of the present disclosure. However, such changes or modifications should be deemed as equivalent examples of the present disclosure. Any simple modification, equivalent change and modification made to the above examples according to the technical essence of the present disclosure without departing from the content of the technical solution of the present disclosure should fall within the scope of the technical solution of the present disclosure.

What is claimed is:

1. A preparation method of a composite slow-release nano-nitrogen fertilizer, comprising the following steps:
    step S1, sieving cellulose and nanoclay and adding into water and stirring to allow a reaction to obtain a mixture, subjecting the mixture to solid-liquid separation, and then subjecting an obtained solid to drying, crushing, and sieving in sequence to obtain a solid sample $a_1$;
    step S2, subjecting the solid sample $a_1$ to pyrolysis at a pyrolysis temperature of 500° C. to 800° C. for 2 h to 3 h under a nitrogen atmosphere, and then cooling an obtained product to a room temperature to obtain a solid sample $a_2$;
    step S3, sieving humic acid and the nanoclay and adding into water and stirring to allow a reaction to obtain a mixture, subjecting the mixture to solid-liquid separation, and then subjecting an obtained solid to drying, crushing, and sieving in sequence to obtain a solid sample $b_2$; and
    step S4, subjecting the solid sample $a_2$, the solid sample $b_2$, and urea to melt-blending, and then subjecting an obtained mixture to washing with anhydrous ethanol, drying, and crushing in sequence to obtain the composite slow-release nano-nitrogen fertilizer.

2. The preparation method of a composite slow-release nano-nitrogen fertilizer according to claim 1, wherein the nanoclay in steps S1 and S3 is one or two selected from the group consisting of montmorillonite and halloysite.

3. The preparation method of a composite slow-release nano-nitrogen fertilizer according to claim 1, wherein the nanoclay in steps S1 and S3 is washed with hydrochloric acid before use; and a washing process comprises: mixing the nanoclay and hydrochloric acid, having a mass fraction of 30% to 35% at a mass-to-volume ratio of 1 g:(50-100) mL, stirring an obtained mixture at a room temperature for 0.5 h to 1 h, and then conducting solid-liquid separation, drying, crushing, and sieving in sequence to obtain a pretreated nanoclay.

4. The preparation method of a composite slow-release nano-nitrogen fertilizer according to claim 1, wherein the cellulose, the nanoclay, and the water are at a mass ratio of (7-8):1:(400-500), and the reaction is conducted by stirring at 75° C. to 90° C. for 2 h to 3 h in step S1.

5. The preparation method of a composite slow-release nano-nitrogen fertilizer according to claim 1, wherein the nitrogen atmosphere has a nitrogen flow rate of (20-40) mL/min$^{-1}$, and the pyrolysis temperature is obtained by heating at (10-15°) C/min$^{-1}$ in step S2.

6. The preparation method of a composite slow-release nano-nitrogen fertilizer according to claim 1, wherein the humic acid, the nanoclay, and the water are at a mass ratio of (10-13):1:(400-500), and the reaction is conducted by stirring at 50° C. to 60° C. for 2 h to 3 h in step S3.

7. The preparation method of a composite slow-release nano-nitrogen fertilizer according to claim 1, wherein the solid sample $a_2$, the solid sample $b_2$, and the urea are at a mass ratio of (1-3):(1-3):(5-10), the melt-blending is conducted at 140° C. to 150° C., and the washing with the anhydrous ethanol is conducted 2 to 3 times in step S4.

* * * * *